United States Patent [19]

Hayashi et al.

[11] Patent Number: 5,801,845
[45] Date of Patent: Sep. 1, 1998

[54] IMAGE DATA PROCESSOR FOR REPRESENTING GRAY LEVELS BY A PLURALITY OF PIXELS

[75] Inventors: Syuji Hayashi; Masaya Fujimoto; Koji Nakamura; Ryuichi Okumura; Haruo Yamamoto, all of Osaka, Japan

[73] Assignee: Mita Industrial Co., Ltd., Osaka, Japan

[21] Appl. No.: 580,331

[22] Filed: Dec. 28, 1995

[30] Foreign Application Priority Data

Jan. 19, 1995 [JP] Japan ................................. 7-006167

[51] Int. Cl.$^6$ ................................................. H04N 1/407
[52] U.S. Cl. ........................... 358/458; 358/296; 358/406; 358/504; 358/455
[58] Field of Search ........................... 358/296, 298, 358/447, 455, 456, 457, 458, 300, 401, 501, 406, 504, 448; 347/188, 190

[56] References Cited

U.S. PATENT DOCUMENTS

| | | | |
|---|---|---|---|
| 5,289,294 | 2/1994 | Fujisawa | 358/461 |
| 5,359,424 | 10/1994 | Kobayashi | 358/296 |
| 5,515,480 | 5/1996 | Frazier | 395/109 |
| 5,642,204 | 6/1997 | Wang | 358/455 |

*Primary Examiner*—Peter S. Wong
*Assistant Examiner*—Derek J. Jardieu
*Attorney, Agent, or Firm*—Beveridge, DeGrandi, Weilacher and Young, LLP

[57] ABSTRACT

Disclosed is an image data processor for processing input image data representing the gray level of each of pixels constituting an image to produce output image data representing the gray level of each of pixels constituting an output image. The relative position of the pixel corresponding to the input image data in a group of pixels including a predetermined number of pixels is identified. The input image data is subjected to data processing corresponding to the relative position of the pixel in the group of pixels on the basis of the result of the identification. Consequently, gray levels are represented by the entire group of pixels.

24 Claims, 7 Drawing Sheets

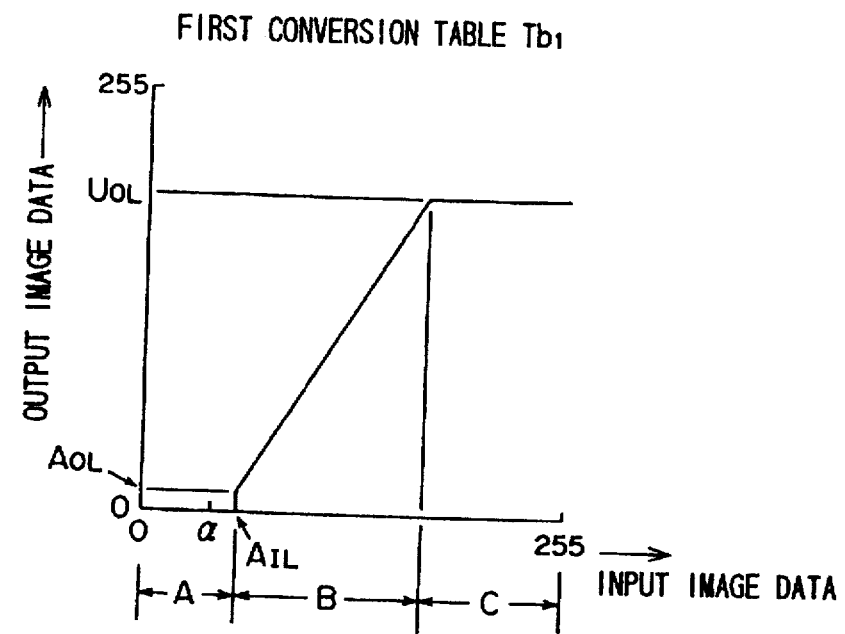
F I G. 4(a)
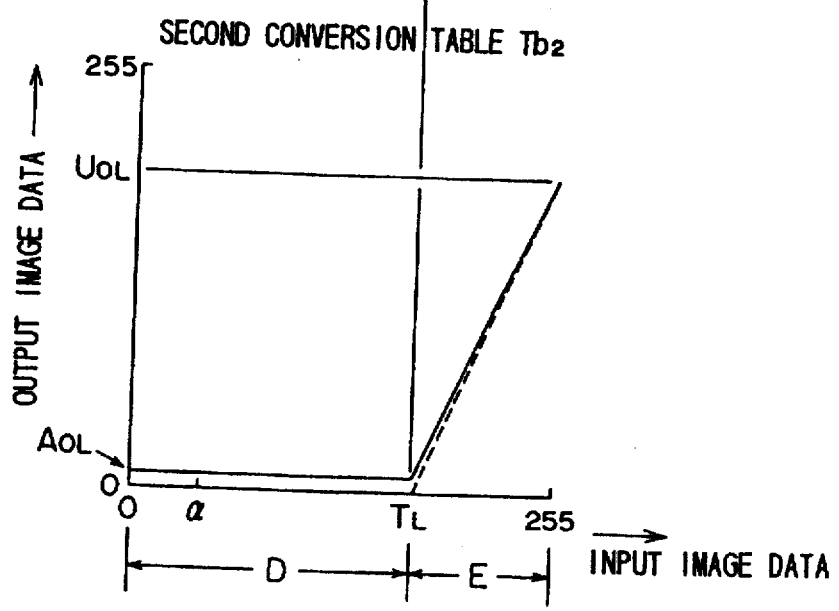
F I G. 4(b)

F I G. 7
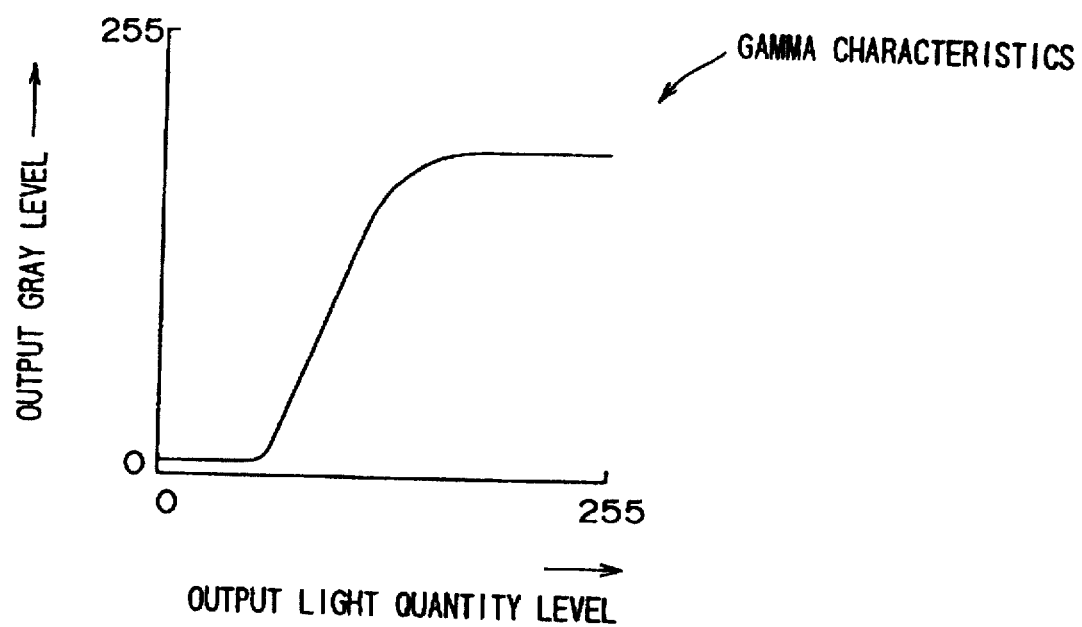

IMAGE DATA PROCESSOR FOR REPRESENTING GRAY LEVELS BY A PLURALITY OF PIXELS

BACKGROUND OF THE INVENTION

1. Field of the Invention

The present invention relates to an image data processor and an image data processing method for processing input image data representing the gray level of each of pixels constituting an image to obtain output image data capable of satisfactorily representing gray levels. The present invention further relates to an image forming apparatus comprising the above-mentioned image data processor.

2. Description of the Related Art

A color copying machine so adapted as to read a color original by a CCD (Charge Coupled Device) scanner for each pixel to convert the color original into data representing the three primary colors (additive), read (R), green (G) and blue (B) and form a color image on the basis of each of the data has been conventionally used. The R, G and B data which are outputted from the scanner are converted into data representing the three primary colors (subtractive), cyan (C), magenta (M) and yellow (Y) which are the additive complementary colors of read (R), green (G) and blue (B). Each of the C, M and Y data is, for example, 8-bit image data representing density at 256 gray levels. The C, M and Y data are subjected to black producing processing for producing data representing black (BK), and the C, M and Y data after the black producing processing are further subjected to suitable correction.

The C, M, Y and BK data are given to a laser emitting section. Laser light at a light quantity level corresponding to each of the data is outputted from the laser emitting section. A correspondence between the data and the output light quantity level is so set as to be linear.

For example, the surface of a photoreceptor is scanned by the laser light at a light quantity level corresponding to the C data, whereby an electrostatic latent image corresponding to cyan is formed on the surface of the photoreceptor. The electrostatic latent image is developed into a cyan toner image. The gray level of the toner image corresponding to each of pixels is substantially equal to the gray level of the final copy image. The gray level of the toner image corresponding to each of the pixels on the surface of the photoreceptor is hereinafter referred to as an "output gray level". The output gray level is determined by the number of toner particles adhering on a unit area corresponding to each of the pixels on the surface of the photoreceptor (the diameter of each of dots formed by the adhering toner). Specifically, the higher the output gray level is, the higher the density of the pixel is. Since the number of toner particles adhering on the photoreceptor depends on the output light quantity level of the laser light, it can be also said that the output gray level is determined by the output light quantity level of the laser light.

The toner image formed on the surface of the photoreceptor is transferred onto a paper sheet. Similarly, magenta, yellow and black toner images, which to the M data, the Y data and the BK data, are transferred one over the other onto the paper sheet. The toner particles transferred on the paper sheet are heated and fixed on the paper sheet. In such a manner, color copying is achieved.

Although a correspondence between the C, M, Y or BK data given to the laser emitting section and the output light quantity level of the laser light emitted from the laser emitting section is linearly set, this is based on the premise that the relationship between the output light quantity level of the laser light and the output gray level is linear. However, the relationship between the output light quantity level of the laser light and the output gray level are not strictly linear due to the characteristics of the photoreceptor.

FIG. 7 is a diagram showing the gamma characteristics which are the relationship between the output light quantity level of the laser light and the output gray level. Since the output light quantity level of the laser light corresponds to the gray level of the C, M, Y or BK data, the gamma characteristics are the input-output characteristics of a printer section including the laser light emitting section, the photoreceptor and the like.

As apparent from FIG. 7, in an area where the output light quantity level of the laser light is relatively low, the output gray level is saturated, whereby toner hardly adheres on the photoreceptor. On the other hand, even in an area where the output light quantity level of the laser light is high, the output gray level is similarly saturated.

The relationship between the output light quantity level of the laser light and the output gray level is thus non-linear. In the above-mentioned color copying machine, even if the color original is represented by data representing density at 256 gray levels, only a color image represented at approximately 180 gray levels, for example, can be substantially formed. That is, gray levels cannot be sufficiently represented.

SUMMARY OF THE INVENTION

A first object of the present invention is to provide an image data processor for producing output image data capable of sufficiently representing gray levels.

A second object of the present invention is to provide an image forming apparatus capable of forming an image whose gray level is sufficiently represented.

A third object of the present invention is to provide a method of producing output image data capable of sufficiently representing gray levels.

An image data processor according to the present invention processes input image data representing the gray level of each of pixels constituting an image to produce output image data. The output image data represents the gray level of each of pixels constituting an output image to be outputted by image outputting means. According to the present invention, the relative position of the pixel corresponding to the input image data in a group of pixels including a predetermined number of pixels is identified. The input image data is subjected to data processing corresponding to the relative position of the pixel in the group of pixels on the basis of the result of the identification.

For example, when the image outputting means has input-output characteristics conforming to such gamma characteristics that the gray level of an output image linearly changes with respect to input data in certain gray level range, while hardly changing outside the a certain gray level range, an upper cut value and an under cut value smaller than the upper cut value are determined in a range in which the gray level of the output image linearly changes. The entire gray level range of the input image data is divided into gray level area portions respectively corresponding to the pixels constituting a group of pixels, and the area portions respectively correspond to the positions of the pixels in the group of pixels. Data which linearly changes from the under cut value to the upper cut value with respect to input image data in each of the gray level area portions is outputted as output image data corresponding to the input image data.

Even if data corresponding to n pixels constituting the group of pixels belong to the same gray level area portion, for example, the output image data differs for each pixel. As a result, the gray level of an image to be formed is represented by the gray levels of a plurality of pixels in combination. Consequently, since the number of representable gray levels increases, the gray level which cannot be sufficiently represented due to saturation of the output gray level can be also apparently sufficiently represented. Consequently, an image of many levels is satisfactorily represented, whereby an image formed by the image outputting means can be increased in grade.

It is preferable that the under cut value is outputted as output image data with respect to input image data which is shy of the gray level area portion corresponding to the position of the pixel in the group of pixels. On the other hand, it is preferable that the upper cut value is outputted as output image data with respect to input image data which exceeds the gray level area portion corresponding to the position of the pixel in the group of pixels.

The group of pixels may be constituted by two pixels, for example. In this case, the entire gray level range of the input image data is divided into two. For example, it is assumed that both input image data corresponding to the two pixels correspond to a high gray level that belongs to a saturated area. At this time, output image data at the upper cut level is outputted with respect to one of the pixels, while image data, whose value is slightly small, linearly corresponding to the input image data is outputted with respect to the other pixel.

The size of the pixel is generally very small for the human eyes. Consequently, a gray level perceived by the human eyes becomes a gray level as the entire group of pixels. Therefore, the gray level perceived by the human eyes becomes a gray level at which the gray levels of the pixels are affected by one another. Consequently, since the gray level which cannot be represented by one pixel can be apparently represented by two pixels, the number of representable gray levels increases.

Image data processing may be performed by providing for each gray level area portion a data conversion table storing the output image data which linearly changes from the under cut value to the upper cut value with respect to the input image data in the gray level area portion.

Furthermore, it is preferable that the under cut value is set to be equal to input data for the image outputting means in the vicinity of a point at which the slope of an input-output characteristic curve of the image outputting means changes from a value of less than a predetermined threshold value to a value of not less than the predetermined threshold value in the input-output characteristic curve. On the other hand, it is preferable that the upper cut value is set to be equal to input data for the image outputting means in the vicinity of a point at which the slope of the input-output characteristic curve of the image outputting means changes from a value of not less than a predetermined threshold value to a value of less than the predetermined threshold value in the input-output characteristic curve.

As a result, the values of input image data in the vicinity of the boundary between an area where the output gray level is saturated and an area where it linearly changes are taken as the under cut value and the upper cut value. Consequently, images at the under cut level and the upper cut level can be faithfully reproduced.

Furthermore, a boundary value in dividing the gray level range of the input image data into the plurality of gray level area portions may be variably set. Consequently, the gray level at the boundary between the gray level area portions can be changed, whereby the image can be formed at a gray level corresponding to the characteristics of the human eyes. For example, the ability of the human eyes to identify the change of a low gray level is relatively higher. Even if the boundary value in dividing the gray level range is set to be relatively high, therefore, an image of more levels can be apparently formed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4(a) and 4(b) are diagrams respectively representing conversion tables used in converting input image data outputted from an image scanner into output image data corresponding to the output light quantity of a laser scanning unit in the form of conversion output characteristics;

FIG. 7 is a diagram for explaining gamma characteristics which are the relationship between the output light quantity level of laser light and the gray level (output gray level) of a toner image formed on a photoreceptor.

DESCRIPTION OF THE PREFERRED EMBODIMENTS

Figure 1:
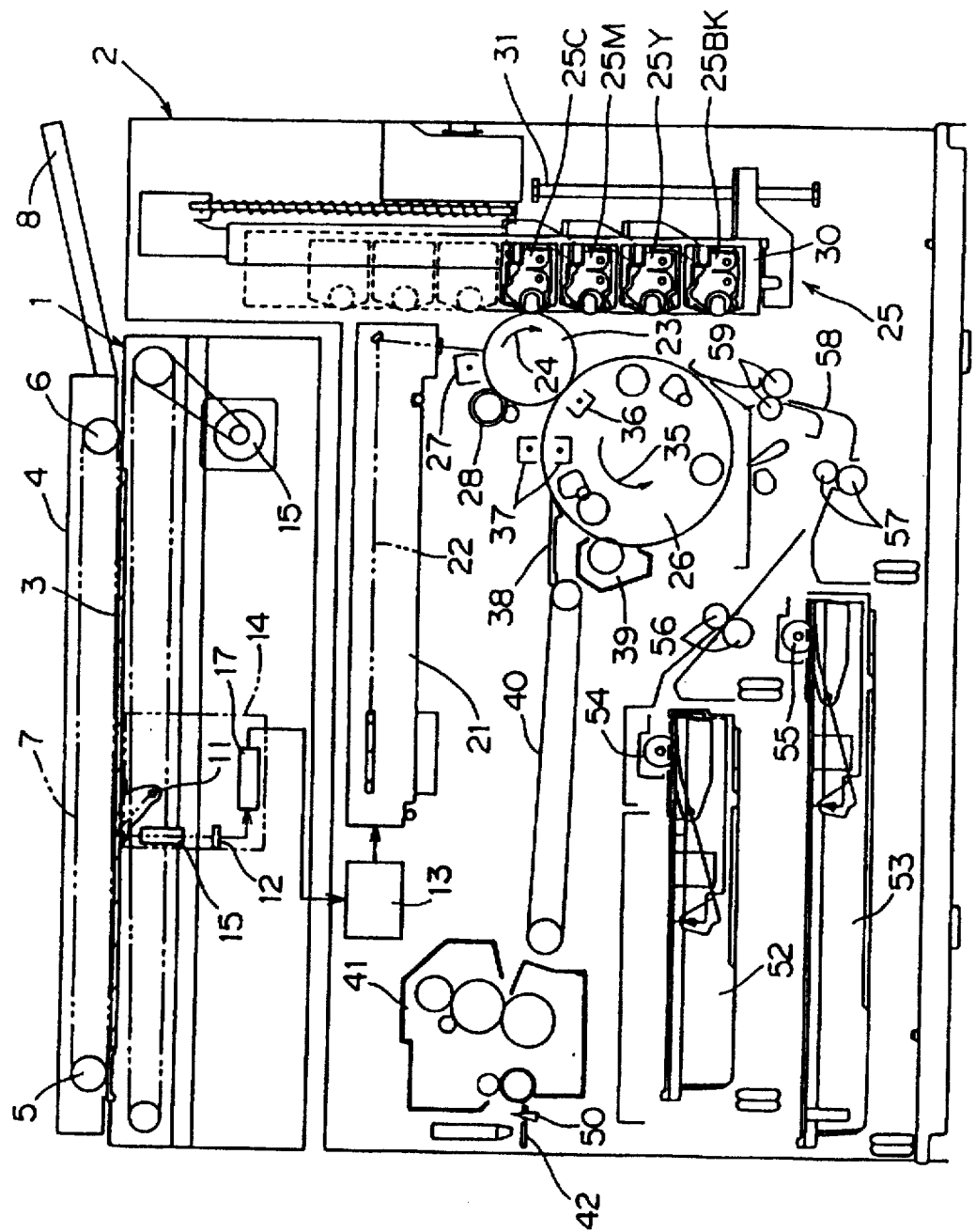
FIG. 1 is a block diagram showing the entire construction of a digital color copying machine which is one embodiment of an image forming apparatus according to the present invention.

FIG. 1 is a schematic view showing the entire construction of a digital color copying machine which is one embodiment of an image forming apparatus according to the present invention. The digital color copying machine comprises a scanner section 1 for reading an original and a printer section 2 serving as image outputting means for processing a signal from the scanner section 1 to produce a color image. A transparent plate 3 on which an original is set is provided on the scanner section 1. An automatic document feeder 4 is further provided above the transparent plate 3. The automatic document feeder 4 comprises a pair of driving rollers 5 and 6 and an endless belt 7 wound around the driving rollers 5 and 6. A plurality of originals (not shown) set on an original tray 8 are fed one at a time onto the transparent plate 3 by the automatic document feeder 4, and are set in a predetermined position.

A scanning and reading section 14 comprising a light source 11 and a one-dimensional color CCD (Charge Coupled Device) image sensor 12 is provided below the transparent plate 3. The scanning and reading section 14 is displaced back and forth along the transparent plate 3 upon receipt of a driving force from an optical motor 15.

Consequently, the original set on the transparent plate 3 is illuminated and scanned. In the process of the illumination and scanning, light emitted from the light source 11 is reflected from the surface of the original, and the reflected light is incident on the image sensor 12 through a lens 16. Horizontal scanning of the original is achieved by electrical scanning using the image sensor 12, and vertical scanning of the original is achieved by mechanical scanning using the movement of the scanning and reading section 14. As a result, an output of the image sensor 12 which is provided in time series becomes a signal representing an original image. Consequently, the image signal outputted from the image sensor 12 represents one original image which is constituted by a plurality of scanning lines each including a plurality of pixels.

Data representing the three primary colors (additive), read, green and blue are outputted from the color image sensor 12. The respective data are converted into digital data in a preprocessing section 17 provided in the scanner section 1, and the digital data are further converted into C, M and Y data respectively corresponding to cyan (C), magenta (M) and yellow (Y) which are the three primary colors (subtractive). Each of the C, M and Y data is, for example, 8-bit data. Therefore, each of the C, M and Y data represents density at 256 gray levels. Further, the C, M and Y data are subjected to predetermined processing in the preprocessing section 17, whereby BK data corresponding to black is further produced in addition to the C, M and Y data. The C, M, Y and BK data are given to an input-output level converting section (hereinafter merely referred to as a "level converting section") 13 which is an image data processor according to one embodiment of the present invention.

Each of the C, M, Y and BK data given to the level converting section 13 shall be hereinafter referred to as "input image data", and the gray level represented by the input image data shall be hereinafter referred to as an "input gray level".

The level converting section 13 converts the given input image data into output image data in accordance with a predetermined rule, and then feeds the output image data to a laser scanning unit 21 in the printer section 2. The output image data corresponds to the output light quantity level of laser light to be outputted from the laser scanning unit 21. The details of the operation of the level converting section 13 will be described later.

The laser scanning unit 21 outputs laser light 22 corresponding to an output light quantity level represented by the given output image data. The laser light 22 is introduced into a photoreceptor 23 which is in a rectangular parallelopiped shape, to expose the photoreceptor 23. The photoreceptor 23 rotates in a direction indicated by an arrow 24 around its axis. The surface of the photoreceptor 23 before the exposure is uniformly charged by a charger 27. Therefore, an electrostatic latent image corresponding to the output light quantity level of the laser light 22 is formed on the surface of the photoreceptor 23 upon exposure made by the laser light 22.

The electrostatic latent image is developed into a toner image by a developing section 25. At this time, the gray level of the toner image corresponding to each of the pixels is substantially the same as the gray level of the final copy image. The gray level of the toner image corresponding to each of the pixels shall be hereinafter referred to as an "output gray level". The output gray level corresponds to the number of adhering toner particles in a unit area corresponding to one pixel (the diameter of each of dots formed by the adhering toner). The amount of adhesion of toner depends on the output light quantity level of the laser light 22, whereby it can be also said that the output gray level is determined by the output light quantity level of the laser light 22.

The toner image is transferred onto a paper sheet wound around the transfer drum 26 which is in a rectangular parallelopiped shape and which is disposed in close proximity to the surface of the photoreceptor 23. The surface of the photoreceptor 23 on which the toner image has been transferred is cleaned by a cleaning device 28.

The developing section 25 comprises a holding member 30 for arranging and holding developing cartridges 25C, 25M, 25Y and 25BK in this order from the top, which respectively hold cyan, magenta, yellow and black toner particles, and an up-and-down mechanism 31 for moving the holding member 30 up and down. By this construction, the developing cartridges 25C, 25M, 25Y and 25BK are switched in conformity with the C, M, Y and BK data given to the laser scanning unit 21, to abut against the photoreceptor 23. Consequently, cyan, magenta, yellow and black toner images are successively formed on the surface of the photoreceptor 23.

The transfer drum 26 is driven to rotate in a direction indicated by an arrow 35 around its axis so that the peripheral speed thereof becomes equal to the peripheral speed of the photoreceptor 23. A transferred 36 is provided inside the transfer drum 26. The transferred 36 transfers toner on the surface of the photoreceptor 23 to the paper sheet wound around the transfer drum 26 by high frequency discharges. In addition, a pair of separators 37 for making the separation of the paper sheet easy by corona discharges is disposed on the downstream side of the transferred 36 with respect to the direction of rotation of the transfer drum 26. A separating claw 38 for separating the paper sheet on which the toner image has been transferred from the photoreceptor 23 is further provided on the downstream side of the separator 37.

A cleaning device 39 for cleaning the surface of the transfer drum 26 from which the paper sheet has been separated is further provided around the transfer drum 26. The separating claw 38 and the cleaning device 39 are constructed so as to be movable toward and apart from the transfer drum 26.

The paper sheet separated from the transfer drum 26 by the separating claw 38 is introduced by a conveying section 40 into a fixing section 41, where fixing processing of the toner image on the surface of the paper sheet is performed. The paper sheet on which the toner image has been fixed is discharged outward through a paper discharging path 42.

Paper sheets have been stacked in cassettes 52 and 53, which is delivered by paper feeding rollers 54 and 55, and is introduced into a paper conveying path 58 by conveying rollers 56 and 57. The paper sheet is fed toward the transfer drum 26 after finely adjusting paper feeding timing by a registration roller 59 in the vicinity of the transfer drum 26. The fed paper sheet is held by a clip mechanism (not shown), and is wound around the transfer drum 26 as the transfer drum 26 rotates.

The paper sheet wound around the transfer drum 26 is held on the surface of the transfer drum 26 before transfer of the cyan, magenta, yellow and black toner images is terminated. In a period during which the cyan, magenta and yellow toner images are formed on the paper sheet, the separating claw 38 and the cleaning device 39 are caused to retreat to positions separated from the transfer drum 26. After the toner images of the three colors have been transferred on the paper sheet, the separating claw 38 and the cleaning device 39 are brought into contact with the transfer drum 26, whereby discharges in the separator 36 are induced.

When the leading end of the paper sheet on which the toner image of black which is the fourth color has been transferred reaches the separating claw 38, the held state of the clip mechanism is released. The paper sheet separated by the separating claw 38 is introduced into the fixing section 41 through the conveying section 40.

When single color copying using black toner, for example, is made, the separating claw 38 and the cleaning device 39, of course, abut against the transfer drum 26 from the beginning, whereby the paper does not lead to the vicinity of the cleaning device 39.

Figure 2:
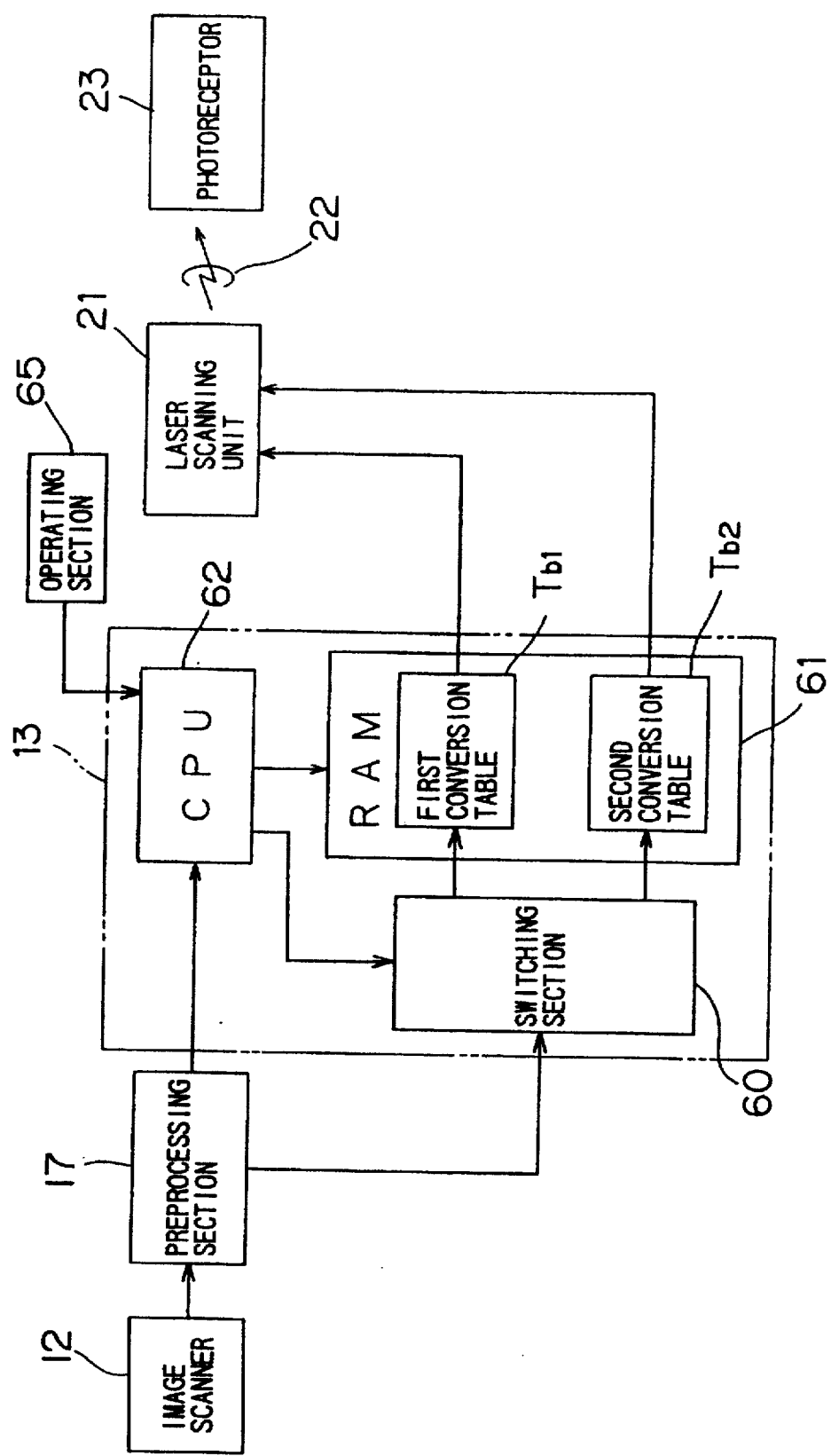
FIG. 2 is a block diagram for explaining converting processing in a level converting section constituting a part of the digital color copying machine.

FIG. 2 is a block diagram for explaining converting processing of input image data in the level converting section 13.

Input image data representing density at 256 gray levels is outputted for each pixel through the preprocessing section 17, as described above, from the image scanner 12. The input image data is given to a RAM (Random Access Memory) 61 through a mechanical or electronic switching section 60, for example, and is given to a CPU (Central Processing Unit) 62 serving as position identifying means. The RAM 61, the CPU 62 and the switching section 60 realize a function of data processing means in co-operation with one another.

Figure 3:
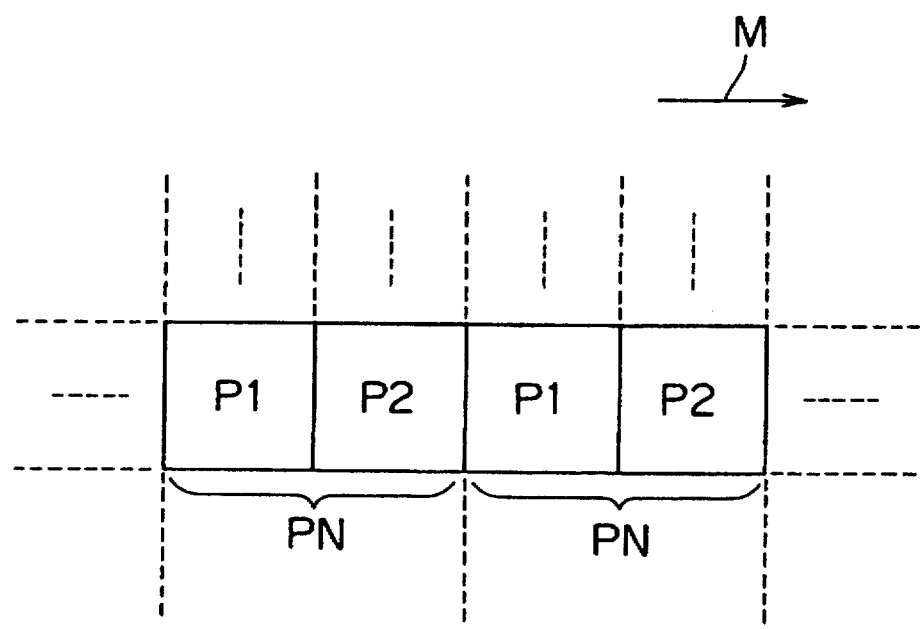
FIG. 3 is a diagram for explaining a group of pixels which is constituted by a first pixel and a second pixel.

A conversion table for converting the given input image data into output image data representing the output light quantity level of the laser light 22 is stored in the RAM 61. The conversion table is constituted by two conversion tables, i.e., a first conversion table $T_{b1}$ and a second conversion table $T_{b2}$. The first conversion table $T_{b1}$ corresponds, in a group of pixels PN which is constituted by two pixels, i.e., a first pixel P1 and a second pixel P2 as shown in FIG. 3, to the first pixel P1 on the upstream side in the direction of horizontal scanning M (the direction of horizontal scanning of the image sensor 12). The first pixel P1 and second pixel P2 are continuous in the direction of horizontal scanning M. On the other hand, the second conversion table $T_{b2}$ corresponds to the second pixel P2 on the downstream side in the direction of horizontal scanning M. The above-mentioned input image data is given as an address to either one of the first conversion table $T_{b1}$ and the second conversion table $T_{b2}$ which are stored in the RAM 60. Consequently, data stored in an address designated by the input image data is outputted as output image data.

Judgment which of the conversion tables is to be given the input image data is made by the CPU 62. More specifically, the CPU 62 determines which of the first pixel P1 and the second pixel P2 constituting the group of pixels PN corresponds to the given input image data. That is, the relative position of the pixel corresponding to the input image data in the group of pixels PN is identified. The identifying processing may be performed by using a counter which is cleared every time the input image data is given twice.

When it is determined that the given input image data corresponds to the first pixel P1, the CPU 62 so controls the switching section 60 that the input image data is given to only the first conversion table $T_{b1}$. On the other hand, when it is determined that the given input image data corresponds to the second pixel P2, the CPU 62 so controls the switching section 60 that the input image data is given to only the second conversion table $T_{b2}$.

The output image data outputted from the RAM 61 is given to the laser scanning unit 21. The laser scanning unit 21 irradiates the laser light 22 at an output light quantity level corresponding to the given output image data onto the photoreceptor 23, to expose the photoreceptor 23, as described above.

FIGS. 4(a) and 4(b) are diagrams for respectively explaining the contents of the first conversion table $T_{b1}$ and the second conversion table $T_{b2}$. In FIGS. 4(a) and 4(b), the input image data is used to enter the horizontal axis, and the output image data is used to enter the vertical axis. Since the output image data represents the density of each of the pixels, the larger the value thereof is, the higher the density is. On the other hand, if the output light quantity level of the laser scanning unit 21 is increased, the amount of toner adhering on the photoreceptor 23 is increased. Consequently, the larger the value of the output image data is, the greater the output light quantity level is.

The first conversion table $T_{b1}$ corresponds to the first pixel P1, as described above. The first conversion table $T_{b1}$ is for representing the gray level in an area where the input image data is at a relatively low level of not more than a boundary level $T_L$ (for example, $T_L$=180). Specifically, the contents of the first conversion table $T_{b1}$ are so set that the output image data becomes zero in an A area where the input image data is at not less than the lower-limit level (the zero level) and less than an under cut input level $A_{IL}$ (for example, $A_{IL}$=60), as shown in FIG. 4(a). Further, the contents of the first conversion table $T_{b1}$ are so set that the output image data linearly changes between an under cut output level $A_{OL}$ (for example, $A_{OL}$=15) and an upper cut output level $U_{OL}$ (for example, $U_{OL}$=200) in a B area where the input image data is at not less than the under cut input level $A_{IL}$ nor more than the boundary level $T_L$. In addition, the first conversion table $T_{b1}$ is so set that the output image data becomes constant at the upper cut output level $U_{OL}$ irrespective of the input image data if the input image data is at more than the boundary level $T_L$ and not more than the upper-limit level (the 256 level). The above-mentioned boundary level $T_L$ has a level between 200 and 255, for example.

The above-mentioned under cut output level $A_{OL}$ is a lower-limit level at which toner can adhere to the photoreceptor 23. Specifically, at the output light quantity level of the laser scanning unit 21 corresponding to the output image data whose level is below the under cut output level $A_{OL}$, toner hardly adheres to the photoreceptor 23 due to an insufficient light quantity in terms of the characteristics of the photoreceptor 23. Therefore, the output gray level which is the gray level of the toner image hardly changes.

On the other hand, the above-mentioned upper cut output level $U_{OL}$ is an upper-limit level at which the density of the toner image formed on the photoreceptor 23 is not saturated. Specifically, at the output light quantity level of the laser scanning unit 21 corresponding to the output image data whose level exceeds the upper cut output level $U_{OL}$, the amount of adhesion of toner is saturated due to an excess light quantity in terms of the characteristics of the photoreceptor 23. Therefore, the output gray level hardly changes.

The first conversion table $T_{b1}$ is for performing data converting processing utilizing the output light quantity level in a range in which the relationship between the output light quantity level of the laser scanning unit 21 and the output gray level is linear with respect to input image data whose value is relatively small. The output light quantity level of the laser scanning unit 21 has a one-to-one correspondence with the output image data inputted to the laser scanning unit 21. Consequently, a linear portion of the input-output characteristics of the printer section 2 including the laser scanning unit 21 and the photoreceptor 23 is utilized.

Processing for determining the under cut output level $A_{OL}$ and the upper cut output level $U_{OL}$ will be described later.

On the other hand, the second conversion table $T_{b2}$ corresponds to the second pixel P2, as described above. The second conversion table $T_{b2}$ is for producing output image data which linearly changes with respect to input image data whose value is relatively large. Specifically, in the second conversion table $T_{b2}$, the output image data becomes constant at an under cut output level $A_{OL}$ irrespective of the input image data in a D area where the input image data is at not less than the lower-limit level (the zero level) nor more than a boundary level $T_L$, as shown in FIG. 4(b). In addition, the output image data linearly changes between the under cut output level $A_{OL}$ and an upper cut output level $U_{OL}$ in an E area where the input image data is at more than the boundary level $T_L$ and not more than the upper-limit level (the 255 level).

The second conversion table $T_{b2}$ is for performing data converting processing utilizing the output light quantity level in a range in which the relationship between the output light quantity level of the laser scanning unit 21 and the output gray level is linear with respect to input image data whose value is relatively large. Although the output gray level corresponding to the input image data in the D area hardly changes, the output image data is at the under cut output level $A_{OL}$ with the intention of supplementing the gray level represented by the first pixel P1.

If the output image data is less than the under cut output level $A_{OL}$, toner hardly adheres on the surface of the photoreceptor 23, as described above. As indicated by a broken line in FIG. 4(b), the contents of the second conversion table 62 may be so set that the output image data is made zero if the input image data belongs to the D area, while linearly changing between zero and the upper cut output level $U_{OL}$ if the input image data belongs to the E area.

FIGS. 5(a) through 5(d) are diagrams for specifically explaining the characteristics of the present embodiment. In FIGS. 5(a) to 5(d), the gray level is represented by the density of oblique hatching. The higher the density of the oblique hatching is, the higher the gray level is.

Figure 5A:
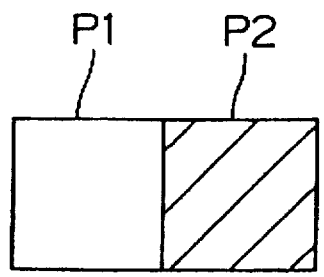
FIGS. 5(a) through 5(d) are diagrams for specifically explaining the characteristics of an embodiment indicating how the gray levels of two pixels apparently vary.
Figure 5B:
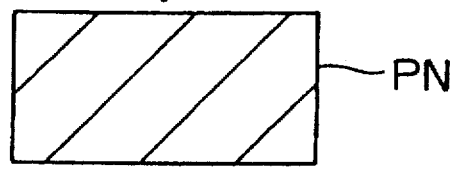

Referring first to FIGS. 5(a) and 5(b), description is made assuming that both input image data corresponding to the first pixel P1 and the second pixel P2 are at an α (for example, α=10) level which is lower than the under cut input level $A_{IL}$.

If it is determined by the CPU 62 that the input image data corresponds to the first pixel P1, the input image data is given to the first conversion table $T_{b1}$, where the input image data is converted. In the first conversion table $T_{b1}$, the output image data is zero if the input image data is at the α level, as shown in FIG. 4(a), whereby the laser light 22 in quantity corresponding to the zero level (the minimum light quantity) is irradiated onto the photoreceptor 23 from the laser scanning unit 21. As a result, the output gray level of the first pixel P1 enters the zero level, as shown in FIG. 5(a).

If it is then determined by the CPU 62 that the input image data corresponds to the second pixel P2, the input image data is given to the second conversion table $T_{b2}$, where the input image data is converted on the basis of the second conversion table $T_{b2}$. In the second conversion table $T_{b2}$, the output image data corresponds to the under cut output level $A_{OL}$ if the input image data is at the α level, as shown in FIG. 4(b), whereby the laser light 22 in quantity corresponding to the under cut output level $A_{OL}$ is irradiated onto the photoreceptor 23 from the laser scanning unit 21. As a result, the output gray level of the second pixel P2 takes a value corresponding to the under out output level $A_{OL}$, as shown in FIG. 5(a).

Since the output gray level of the first pixel P1 is the zero level, and the output gray level of the second pixel P2 is the under cut output level $A_{OL}$, neither of the output gray levels accurately corresponds to the α level which is the input gray level. Since the length of one side of the pixel is about 63 (μm) (=1/16 (mm)), for example, and the ability of the human eyes is not too high with respect to a slight gray level change, however, the output gray level is perceived not for each of the pixels P1 and P2 but as the entire group of pixels PN. That is, the output gray level perceived by the human eyes becomes approximately the α level because the gray levels of the pixels P1 and P2 are affected by each other, as shown in FIG. 5(b).

Figure 5C:
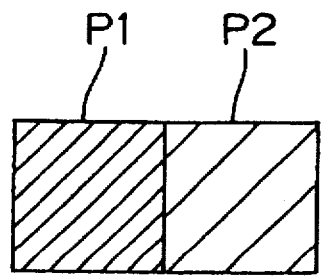
Figure 5D:
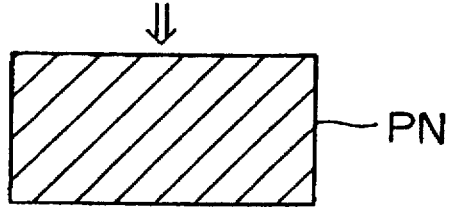

Referring now to FIGS. 5(c) and 5(d), it is assumed that both the input image data respectively corresponding to the first pixel P1 and the second pixel P2 are at the boundary level $T_L$.

In this case, the output image data corresponding to the first pixel P1 enters the upper cut output level $U_{OL}$, while the output image data corresponding to the second pixel P2 enters the under cut output level $A_{OL}$. Consequently, the output gray levels of the first pixel P1 and the second pixel P2 respectively become the $U_{OL}$ level and the $A_{OL}$ level, as shown in FIG. 5(c). Therefore, the gray level perceived by the human eyes becomes approximately the boundary level $T_L$ which is the result of affecting the gray levels of the pixels P1 and P2 by each other.

Figure 6:
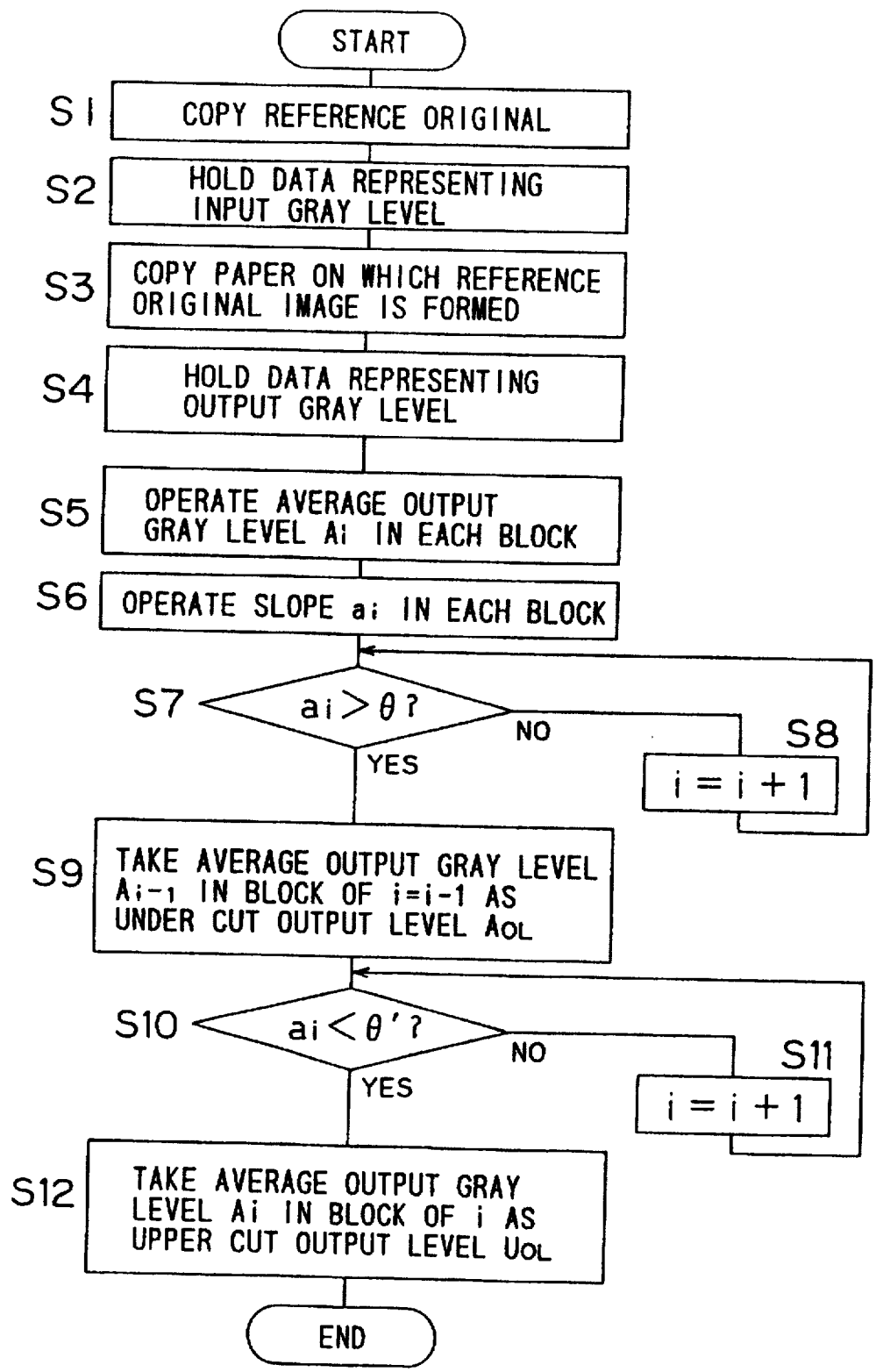
FIG. 6 is a flow chart for explaining processing for determining an under cut output level and an upper cut output level.

FIG. 6 is a flow chart for explaining processing for determining the under cut output level $A_{OL}$ and the upper cut output level $U_{OL}$. This processing is performed in the final step in the process for fabricating a digital color copying machine or at the time of resetting processing in use.

In this processing, a reference original is used. The reference original carries a density pattern in which 256 unit areas which differ in the gray level from pure white to pure black are arranged in the direction of horizontal scanning. An operator sets the reference original in a predetermined position on the transparent plate 3, and causes the copying machine to make color copying of the reference original (step S1). Data representing an input gray level is obtained by the copying operation, and the data is given to the RAM 61 and is temporarily held therein (step S2). In this copying operation, the level converting section 13 does not perform level conversion, to input the input image data as it is as the output image data to the laser scanning unit 21.

The operator then sets the copy paper sheet which has been obtained by the above-mentioned copying operation in a predetermined position on the transparent plate 3, and causes the copying machine to make color copying of the copy paper sheet (step S3). Data representing an output gray level is acquired by the copying operation, and the data is given to the RAM 61 and is temporarily held therein (step S4). In the second copying operation, the image forming operation need not be performed, and the operation of only the scanner section 1 is sufficient to perform the copying operation.

The CPU 62 reads out the data held in the RAM 61 utilizing as one block data corresponding to 16 unit areas which are continuous in the direction of horizontal scanning. The CPU 62 finds the average output gray level $A_i$ (where i=1 to 16) of a plurality of unit areas constituting each of the blocks on the basis of the read data (step S5).

The above-mentioned blocking is performed so as to simplify the processing. Processing may be performed on the basis of data representing the output gray levels in 256 individual unit areas in place of the blocking, as required.

A slope $a_i$ of the output gray level in each of the blocks acquired in the step S5 is acquired on the basis of data representing the input gray level held in the RAM 61 and the average output gray level $A_i$ in each of the blocks (step S6). For example, the slope $a_i$ is found on the basis of the difference between the minimum output gray level and the maximum output gray level in each of the blocks. This processing is processing for finding an inflection point in the change in the data representing the output gray level with respect to the data representing the input gray level (hereinafter referred to as "gamma characteristics"). Specifically, when a gamma characteristic curve is followed, at a given input gray level, a state where the output gray level hardly changes even if the input gray level changes proceeds to a state where the output gray level linearly changes with respect to the input gray level.

After the slope $a_i$ in each of the blocks is found, it is judged whether or not the slope $a_i$ is larger than a predetermined threshold value $\theta$ (step S7). The processing in the step S7 is performed with respect to all blocks by repeating increment of i (step S8).

If it is judged in the step S7 that a slope $a_3$ in a block of i=3, for example, is larger than the threshold value $\theta$, it is considered that the state where the gamma characteristics hardly change proceeds, in the block of i=3, to a state where the gamma characteristics linearly change. The average output gray level $A_i$ in a block of i=2 adjacent to the block of i=3 on the upstream side (on the lower gray level side) in the direction of horizontal scanning is taken as the under cut output level $A_{OL}$ (step S9).

Processing for finding an input gray level at which the state where the output gray level linearly changes with respect to the input gray level proceeds to a state where the output gray level is saturated is then performed. Specifically, it is judged while incrementing i whether or not the slope $a_i$ in each of the blocks is smaller than a predetermined threshold value $\theta'$ (for example, $\theta'$ may equal to $\theta$) (steps S10 and S11). As a result, if it is judged that a slope $a_{12}$ in a block of i=12, for example, is smaller than the threshold value $\theta'$, it is considered that the output gray level enters its saturated state in the block of i=12, and the average output gray level $A_{12}$ in the block of i=12 is taken as the upper cut output level $U_{OL}$ (step S12).

As described in the foregoing, in the digital color copying machine according to the present embodiment, only a linear portion in the gamma characteristic curve (an input-output characteristic curve in the printer section 2) is utilized, and the gray level of an image to be formed is represented by the gray levels of two pixels in combination. Consequently, since the number of representable gray levels increases, the output gray level can be apparently sufficiently changed with respect to the input gray level at which the gray level cannot be sufficiently represented by one pixel particularly due to saturation. Consequently, a good image of many levels can be formed, whereby a high quality image can be formed.

Although the foregoing is the description of the embodiment of the present invention, the present invention is not limited to the above-mentioned embodiment. For example, although in the above-mentioned embodiment, description has been made of a case where the image forming apparatus is applied to the digital color copying machine by way of example, the present invention is also applicable to other apparatuses for forming images such as a digital monochrome copying machine or a color/monochrome facsimile.

Although in the above-mentioned embodiment, description has been made of a case where the boundary level $T_L$ is fixed by way of example, the boundary level $T_L$ may be arbitrarily changed. Specifically, an operating section 65 such as a keyboard may be connected to the CPU 62 in the level converting section 13 to variably set the boundary level $T_L$ from the operating section 65. In this case, the CPU 62 updates the contents of the first conversion table $T_{b1}$ and the second conversion table $T_{b2}$ on the basis of the boundary level $T_L$ newly set, the under cut output level $A_{OL}$, the upper cut output level $U_{OL}$, and the like. This makes it possible to form an image whose gray level is represented suitably for the characteristics of the human eyes, for example. Since the human eyes have the property of relatively satisfactorily identifying the change in a low gray level, whereby an image of more levels can be apparently obtained if the boundary level $T_L$ is set to a relatively high gray level, for example.

Although in the above-mentioned embodiment, the representation of image density at many gray levels is realized using a group of pixels including two pixels, the representation of image density at many gray levels may be realized using a group of pixels including three or more pixels. In this case, the input gray level may be divided into areas whose number corresponds to the number of pixels constituting the group of pixels.

Furthermore, in the above-mentioned embodiment, description has been made of a case where the image data is composed of eight bits to represent density at 256 gray levels with the maximum gray level being 255 by way of example. However, the present invention is also applicable to a system using 7-bit image data representing density at 128 levels, 0 through 127, a system using 9-bit image data representing density at 512 level, 0 through 511, and the like. That is, the form of the representation of image density is arbitrarily selectable.

Although the present invention has been described and illustrated in detail, it is clearly understood that the description is by way of illustration and example only and is not to be taken by way of limitation, the spirit and scope of the present invention being limited only by the terms of the appended claims.

What is claimed is:

1. An image data processor for processing input image data representing a gray level of each of a plurality of pixels constituting an input image to produce output image data representing a gray level of each of a plurality of pixels constituting an output image, the image data processor comprising:

position identifying means for identifying a relative position of a pixel corresponding to the input image data in a group of pixels including a predetermined number of pixels; and data processing means for subjecting the input image data to data processing corresponding to the relative position of the pixel in the group of pixels based on the result of the identification by the position identifying means and producing output image data to be given to image outputting means, the image outputting means having input-output characteristics conforming to gamma characteristics such that a gray level of an output image linearly changes with respect to input data in a certain gray level range, while hardly changing outside the certain gray level range, the data processing means subjecting the input image data to data processing such that an upper cut value and an under cut value smaller than the upper cut value are determined in a range for which the gray level of an output image linearly changes, for each pixel in the group of pixels, an entire gray level range of the input image data is divided into gray level area portions corresponding to the relative position of the pixel in the group of pixels, and the data processing means outputs output image data which linearly changes from the under cut value to the upper cut value with respect to input image data in at least a part of the gray level area portion corresponding to the position of the pixel in the group of pixels, as output image data corresponding to the input image data; and means for variably setting a boundary value which divides the gray level range of the input image into the plurality of level area gray portions.

2. An image data processor according to claim 1, wherein the data processing means outputs the under cut value as output image data with respect to input image data which is below the gray level area portion corresponding to the position of the pixel in the group of pixels, while outputting the upper cut value as output image data with respect to input image data which exceeds the gray level area portion corresponding to the position of the pixel in the group of pixels.

3. An image data processor according to claim 1, wherein the data processing means includes for each gray level area portion a data conversion table storing the output image data which linearly changes from the under cut value to the upper cut value with respect to the input image data in the gray level area portion.

4. An image data processor according to claim 1, wherein the under cut value is equal to output data for the image outputting means in the vicinity of a point at which a slope of an input-output characteristic curve of the image outputting means changes from a value of less than a predetermined threshold value to a value of not less than the predetermined threshold value in the input-output characteristic curve, and the upper cut value is equal to output data for the image outputting means in the vicinity of a point at which the slope of the input-output characteristic curve of the image outputting means changes from a value of not less than the predetermined threshold value to a value of less than the predetermined threshold value in the input-output characteristic curve.

5. An image data processor according to claim 1, wherein the group of pixels includes two adjacent pixels.

6. An image forming apparatus, comprising an image data processor for processing input image data representing a gray level of each of a plurality of pixels constituting an input image to produce output image data representing a gray level of each of a plurality of pixels constituting an output image; and image outputting means for forming an image based on output image data of the image processor, the image outputting means having input-output characteristics conforming to gamma characteristics such that a gray level of an output image linearly changes with respect to input data in a certain gray level range, while hardly changing outside the certain gray level range, the image data processor including position identifying means for identifying a relative position of a pixel corresponding to the input image data in a group of pixels including a predetermined number of pixels; and data processing means for subjecting the input image data to data processing corresponding to the relative position of the pixel in the group of pixels based on the result of the identification by the position identifying means, the data processing means subjecting the input image data to data processing such that an upper cut value and an under cut value smaller than the upper cut value are determined in a range for which the gray level of an output image linearly changes, for each pixel in the group of pixels, an entire gray level range of the input image data is divided into gray level area portions corresponding to the relative position of the pixel in the group of pixels, and the data processing means outputs output image data which linearly changes from the under cut value to the upper cut value with respect to input image data in at least a part of the gray level area portion corresponding to the position of the pixel in the group of pixels, as output image data corresponding to the input image data; and means for variably setting a boundary value which divides the gray level range of the input image into the plurality of level area gray portions.

7. An image forming apparatus according to claim 6, wherein the image outputting means includes
a photoreceptor,
exposing means for exposing the photoreceptor to light in a quantity corresponding to the output image data of the image data processor in order to write an electrostatic latent image onto the photoreceptor, and
developing means for developing the electrostatic latent image formed on the photoreceptor into a toner image.

8. An image forming apparatus according to claim 6, wherein the data processing means outputs the under cut value as output image data with respect, to input image data which is below the gray level area portion corresponding to the position of the pixel in the group of pixels, while outputting the upper cut value as output image data with respect to input image data which exceeds the gray level area portion corresponding to the position of the pixel in the group of pixels.

9. An image forming apparatus according to claim 6, wherein the data processing means includes for each gray level area portion a data conversion table storing the output image data which linearly changes from the under cut value to the upper cut value with respect to the input image data in the gray level area portion.

10. An image forming apparatus according to claim 6, wherein the under cut value is equal to output data for the image outputting means in the vicinity of a point at which a slope of an input-output characteristic curve of the image outputting means changes from a value of less than a predetermined threshold value to a value of not less than the predetermined threshold value in the input-output characteristic curve, and the upper cut value is equal to output data for the image outputting means in the vicinity of a point at which the slope of the input-output characteristic curve of the image outputting means changes from a value of not less than the predetermined threshold value to a value of less than the predetermined threshold value in the input-output characteristic curve.

11. An image data processor according to claim 6, wherein the group of pixels includes two adjacent pixels.

12. An image data processor for processing input image data, representing a gray level of each of a plurality of input pixels constituting an input image, to produce output image data, representing a gray level of each of a plurality of output pixels constituting an output image, the image data processor comprising:

means for identifying a relative position of an input pixel within a predetermined group of input pixels; and means for producing output image data corresponding to the input pixel, based upon the identified relative position of the input pixel, the means for producing output image data corresponding to the input pixel including means for dividing an input image data range into a plurality of separate portions, such that a portion of the input image data range corresponds to each input pixel among the predetermined group of input pixels, and means for outputting output image data such that, when input image data representing a gray level of the input pixel is less than the portion of the input image data range corresponding to the input pixel, output image data having a first predetermined value is output, when input image data representing the input pixel falls within the portion of the input image data range corresponding to the input pixel, output image data is output according to a linear relationship with the input image data, and when input image data representing the input pixel is greater than the portion of the input image data range corresponding to the input pixel, output image data having a second predetermined value is output.

13. An image data processor according to claim 12, wherein output image data, which output image data is produced when input image data representing the input pixel falls within the portion of the input image data range corresponding to the input pixel, linearly varies from the first predetermined value to the second predetermined value with respect to the input image data.

14. An image data processor according to claim 12, wherein, for each portion of the input image data range, output image data corresponding to the input image data of the portion of the input image data range is stored in a data conversion table.

15. An image data processor according to claim 12, wherein the output image data is produced by means for outputting an image;

the first predetermined value is equal to a first output value for the means for outputting an image in a vicinity of a value at which a slope of an input-output characteristic curve of the means for outputting an image changes from less than a predetermined threshold value to a value of not less than the predetermined threshold value in the input-output characteristic curve, and the second predetermined value is equal to a second output value for the means for outputting an image in a vicinity of a value at which the slope of the input-output characteristic curve of the means for outputting an image changes from not less than the predetermined threshold value to of less than the predetermined threshold value in the input-output characteristic curve.

16. An image data processor according to claim 12, further including means for variably setting one or more boundary values separating the portions of the input image data range.

17. An image data processor according to claim 12, wherein the predetermined group of input pixels includes two adjacent input pixels.

18. An image forming apparatus, comprising:

an image data processor as recited in claim 12; and image outputting means for forming an image based upon output image data from the image data processor.

19. An image forming apparatus according to claim 18, wherein the image outputting means includes a photoreceptor, exposing means for exposing the photoreceptor light in a quantity corresponding to the output image data of the image data processor in order to write an electrostatic latent image onto the photoreceptor, and developing means for developing the electrostatic latent image formed on the photoreceptor into a toner image.

20. An image forming apparatus according to claim 18, wherein output image data, which output image data is produced when input image data representing the input pixel falls within the portion of the input image data range corresponding to the input pixel, linearly varies from the first predetermined value to the second predetermined value with respect to the input image data.

21. An image forming apparatus according to claim 18, wherein, for each portion of the input image data range, output image data corresponding to the input image data of the portion of the input image data range is stored in a data conversion table.

22. An image forming apparatus according to claim 18, wherein the first predetermined value is equal to a first output value for the means for outputting an image in a vicinity of the value at which the slope of the input-output characteristic curve of the means for outputting an image changes from less than the predetermined threshold value to the value of not less than the predetermined threshold value in the input-output characteristic curve, and the second predetermined value is equal to a second output value data for the means for outputting an image in a vicinity of the value at which the slope of the input-output characteristic curve of the means for outputting an image changes from not less than the predetermined threshold value to of less than the predetermined threshold value in the input-output characteristic curve.

23. An image forming apparatus according to claim 18, further including means for variably setting one or more boundary values separating portions of the input image data range.

24. An image forming apparatus according to claim 18, wherein the predetermined group of input pixels includes two adjacent input pixels.

* * * * *